United States Patent
Lee et al.

(10) Patent No.: US 10,412,978 B2
(45) Date of Patent: Sep. 17, 2019

(54) SUPER CRITICAL HYDROLYSIS EXTRACTION APPARATUS AND HYDROLYSIS METHOD USING THE SAME

(71) Applicant: INNOWAY CO., LTD, Gyeonggi-do (KR)

(72) Inventors: Ho Young Lee, Gyeonggi-do (KR); Jung Min Lee, Gyeonggi-do (KR)

(73) Assignee: INNOWAY CO., LTD, Gyeonggi-do (KR)

( * ) Notice: Subject to any disclaimer, the term of this patent is extended or adjusted under 35 U.S.C. 154(b) by 265 days.

(21) Appl. No.: 15/121,883

(22) PCT Filed: Mar. 28, 2014

(86) PCT No.: PCT/KR2014/002697
§ 371 (c)(1),
(2) Date: Aug. 26, 2016

(87) PCT Pub. No.: WO2015/129951
PCT Pub. Date: Sep. 3, 2015

(65) Prior Publication Data
US 2017/0013864 A1    Jan. 19, 2017

(30) Foreign Application Priority Data
Feb. 26, 2014 (KR) .......... 10-2014-0022925

(51) Int. Cl.
*A23L 3/01* (2006.01)
*A23B 4/26* (2006.01)
(Continued)

(52) U.S. Cl.
CPC .......... *A23L 3/0155* (2013.01); *A23B 4/0053* (2013.01); *A23B 4/26* (2013.01);
(Continued)

(58) Field of Classification Search
CPC .......... A23L 3/015; A23L 3/0155; A23L 3/10; A23B 4/0053; A23B 4/26; A23V 2002/00;
(Continued)

(56) References Cited

U.S. PATENT DOCUMENTS 3,063,594 A * 11/1962 Gerard ............... B01J 3/03
220/327
3,969,196 A * 7/1976 Zosel ............... B01D 3/00
203/49
(Continued)

FOREIGN PATENT DOCUMENTS

JP 363221803 * 9/1988 ............. B01D 11/00
WO WO 2008/156292 12/2008 ............. A23L 3/015

OTHER PUBLICATIONS

Derwent Translated Abstract of Patent Publication JP 363221803, Morozuka (Year: 1988).*
(Continued)

*Primary Examiner* — Joseph W Drodge
(74) *Attorney, Agent, or Firm* — Harness, Dickey & Pierce, P.L.C.

(57) ABSTRACT

There is disclosed a super critical hydrolysis extraction apparatus including a pressure container comprising a body and a lid coupled to the body to close a space formed therein to accommodate an object; a contact unit configured to open and close the body, while moving the lid forward and backward; and a pipeline unit comprising a supply line where a liquid for filling in the pressure container and a discharge line for discharging the liquid of the pressure container.

12 Claims, 5 Drawing Sheets

(51) Int. Cl.
  *A23L 3/10* (2006.01)
  *B01D 11/02* (2006.01)
  *B01J 19/14* (2006.01)
  *B01J 19/24* (2006.01)
  *A23L 3/015* (2006.01)
  *A23B 4/005* (2006.01)

(52) U.S. Cl.
  CPC ............... *A23L 3/015* (2013.01); *A23L 3/10* (2013.01); *B01D 11/0203* (2013.01); *B01J 19/14* (2013.01); *B01J 19/24* (2013.01); *A23V 2002/00* (2013.01); *B01J 2219/00164* (2013.01); *B01J 2219/0886* (2013.01); *B01J 2219/332* (2013.01)

(58) Field of Classification Search
  CPC . B01D 11/02; B01D 11/0203; B01D 11/0215; B01D 11/04; B01D 11/0403; B01D 11/0407; B01J 19/14; B01J 19/24; B01J 19/2415; B01J 2219/00351; B01J 2219/00452; B01J 2219/00477; B01J 2219/00164; B01J 2219/0886; B01J 2219/089; B01J 2219/2401; B01J 2219/332
  USPC .............. 210/149, 175, 511, 634; 127/1, 36; 422/226, 242
  See application file for complete search history.

(56) References Cited

U.S. PATENT DOCUMENTS

| | | | | |
|---|---|---|---|---|
| 4,192,849 | A | 3/1980 | Scheubeck et al. | 422/242 |
| 5,093,983 | A * | 3/1992 | Sooy | H05K 13/0404 29/712 |
| 5,213,029 | A | 5/1993 | Yutaka | 99/474 |
| 5,370,043 | A | 12/1994 | Träff et al. | 99/467 |
| 5,382,414 | A * | 1/1995 | Lautenschlager | B01D 11/0219 204/902 |
| 5,552,039 | A * | 9/1996 | McBrayer, Jr. | B01J 3/042 210/177 |
| 5,824,188 | A | 10/1998 | Prough et al. | 162/49 |
| 6,168,771 | B1 * | 1/2001 | Saho | A62D 3/20 423/210 |
| 6,475,396 | B1 * | 11/2002 | Wofford, III | B01J 19/26 210/198.1 |
| 8,968,479 | B2 * | 3/2015 | Kilambi | C12P 7/10 127/44 |
| 2002/0134704 | A1 * | 9/2002 | Mitchell | B01D 11/0203 208/13 |
| 2003/0057164 | A1 * | 3/2003 | Wofford, III | B01J 19/26 210/758 |
| 2004/0094144 | A1 * | 5/2004 | Ikegami | B01J 3/006 127/1 |
| 2006/0000781 | A1 * | 1/2006 | Seidlitz | B01D 11/0407 210/695 |
| 2011/0226608 | A1 * | 9/2011 | Lautenschlager | B01J 19/126 204/157.15 |
| 2012/0203674 | A1 * | 8/2012 | Balin | G06F 17/22 705/27.1 |
| 2012/0240960 | A1 * | 9/2012 | Cornelissen | B01J 3/03 134/22.1 |
| 2013/0171629 | A1 * | 7/2013 | Brand | B01D 11/0219 435/6.1 |

OTHER PUBLICATIONS

International Search Report (ISR) dated Nov. 25, 2014 in PCT/KR2014/002697, with English Translation.

\* cited by examiner

[Fig. 1]
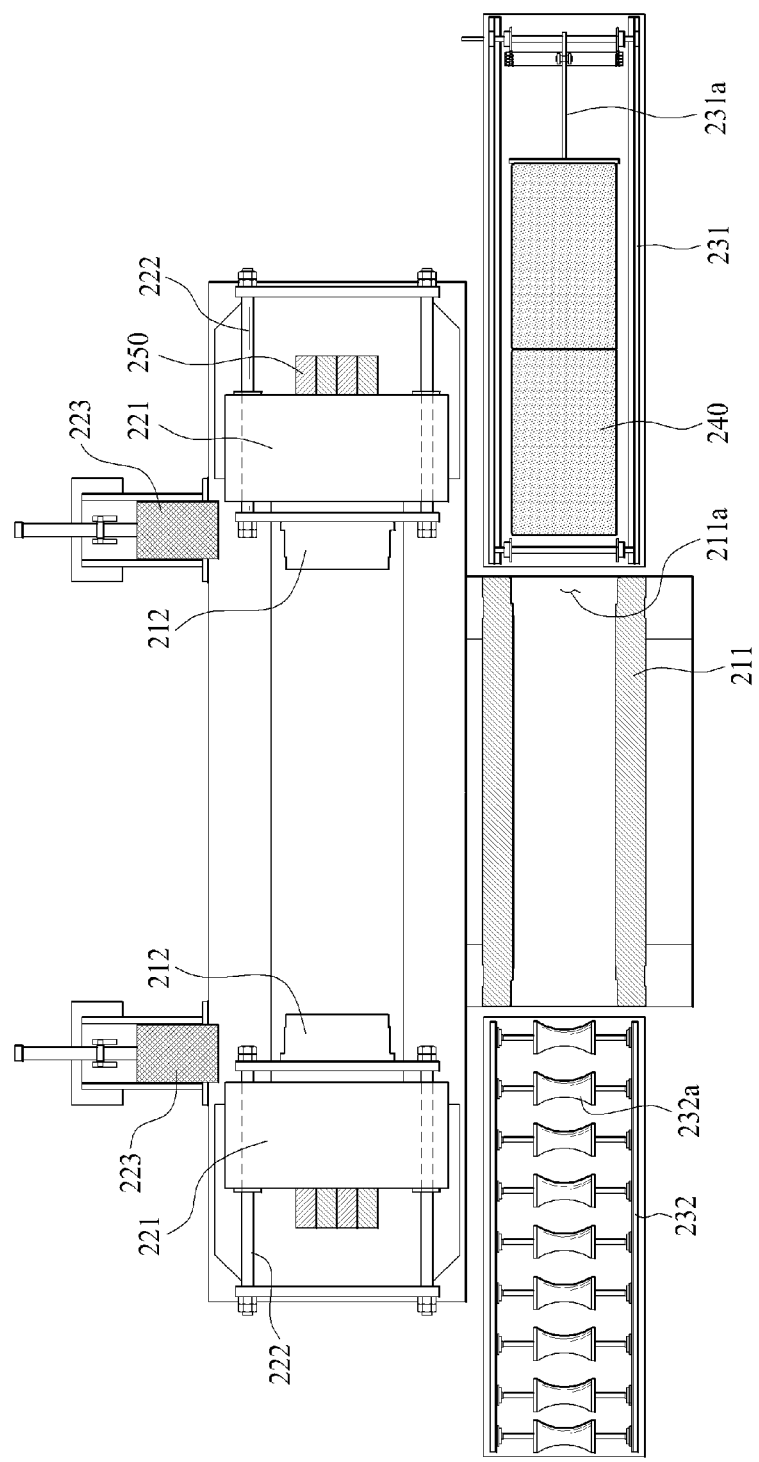

[Fig. 2]
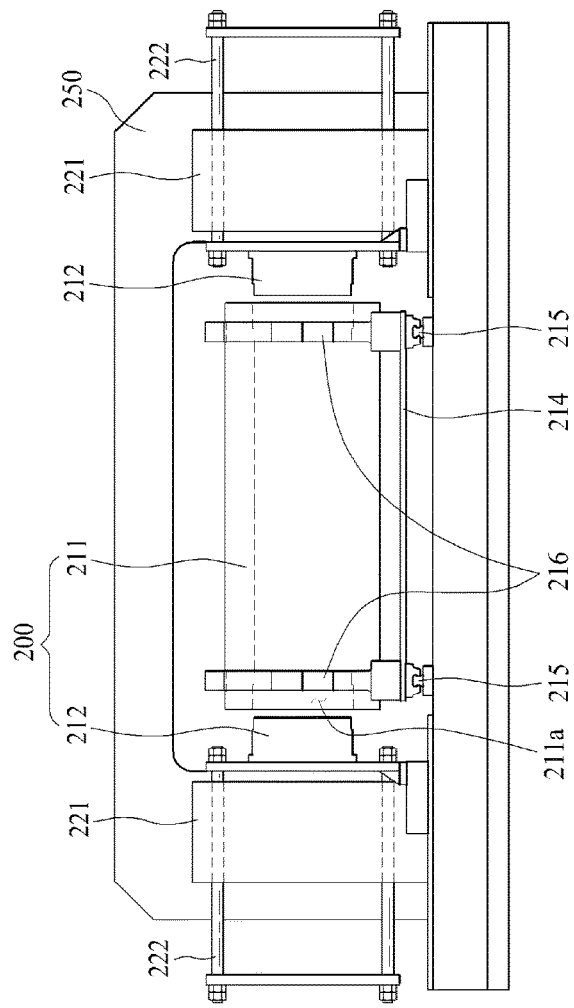
[Fig. 3]
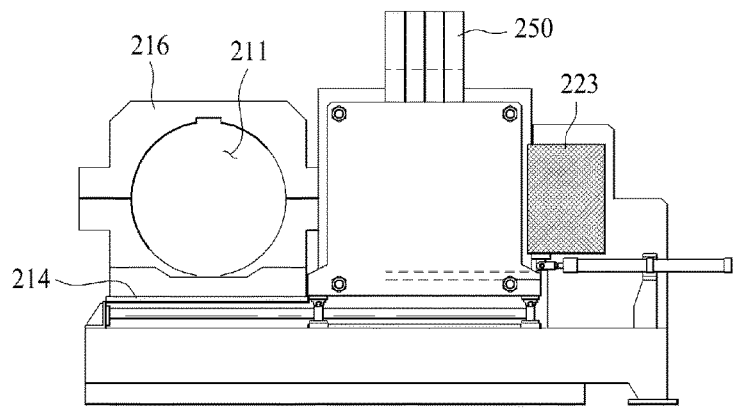

[Fig. 4]
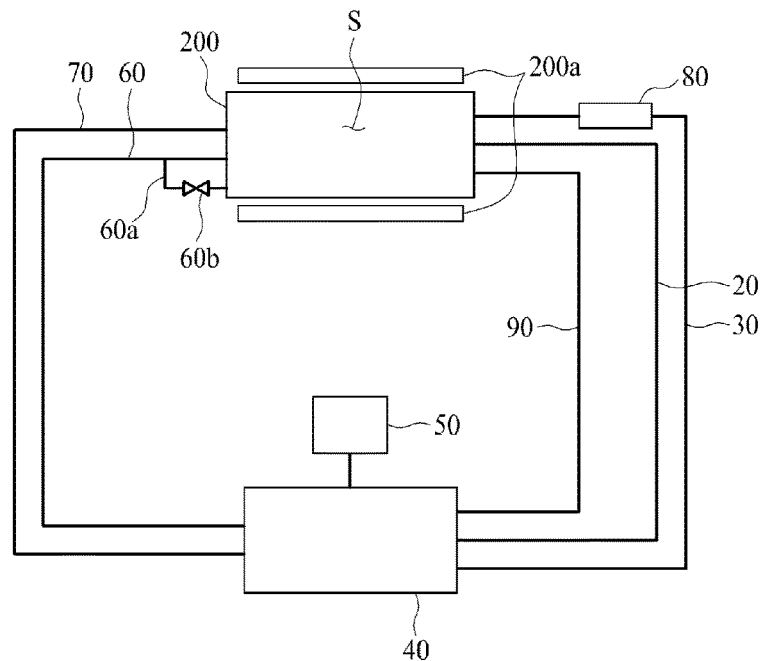
[Fig. 5]
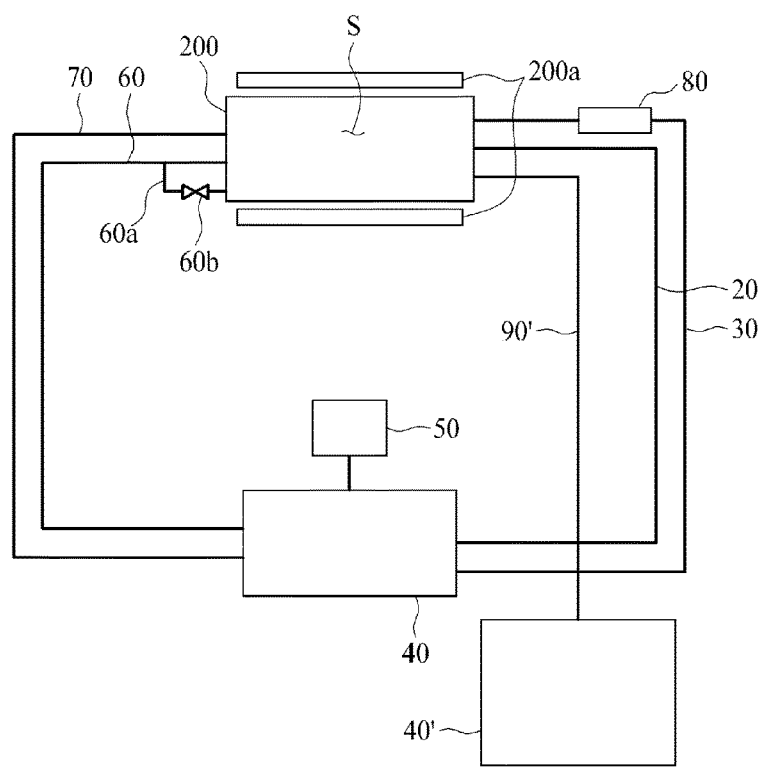

[Fig. 6]
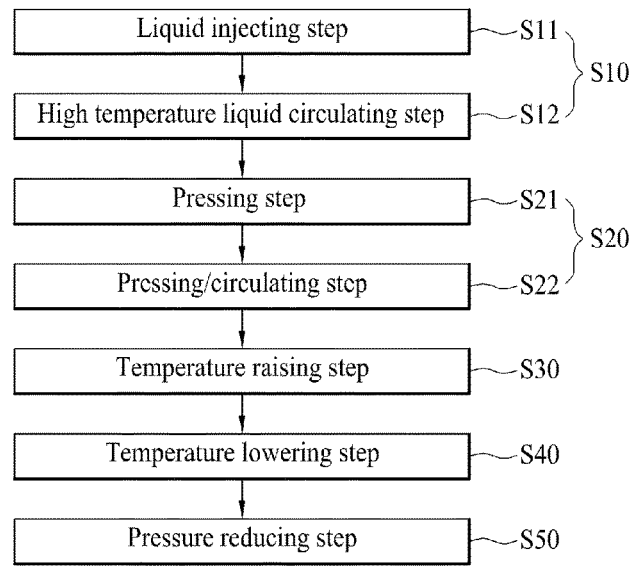
[Fig. 7]
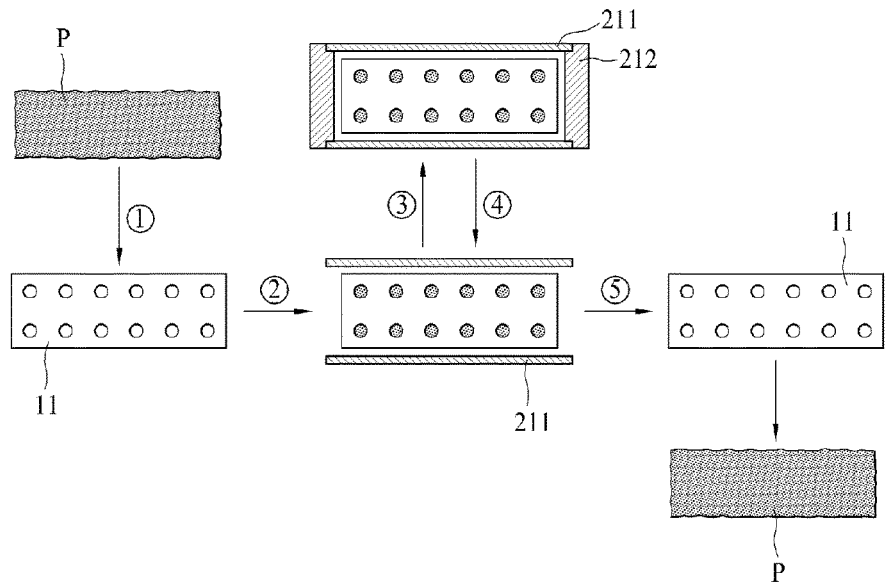

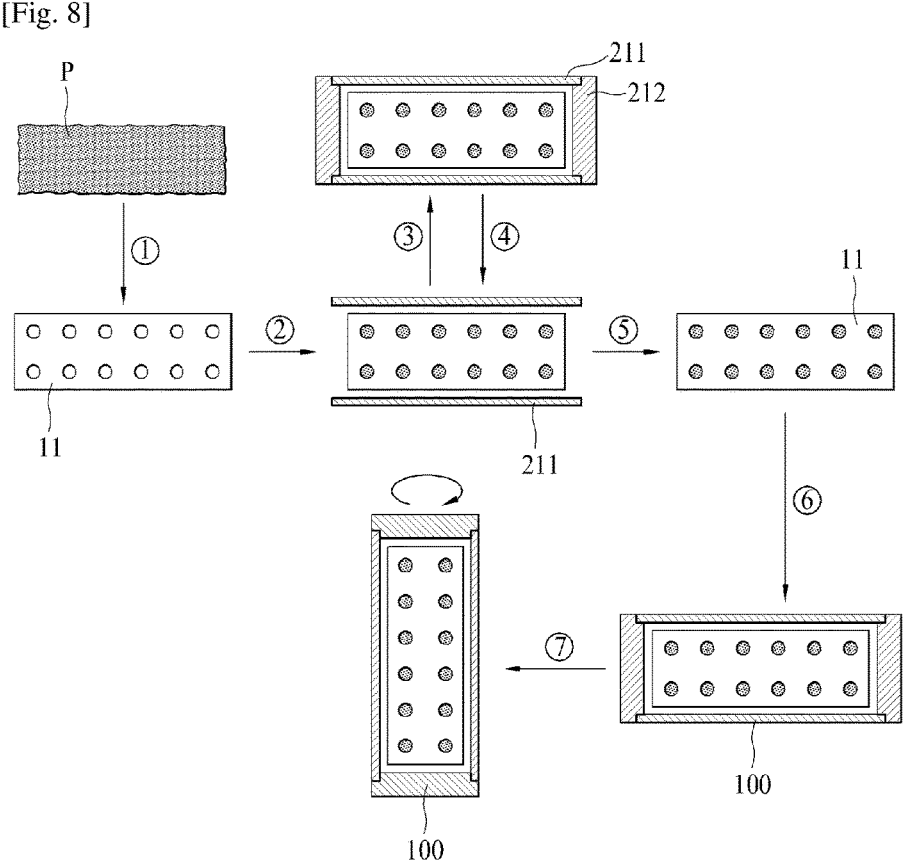
[Fig. 8]

SUPER CRITICAL HYDROLYSIS EXTRACTION APPARATUS AND HYDROLYSIS METHOD USING THE SAME

CROSS-REFERENCE TO RELATED APPLICATIONS

This application is a national phase application of PCT Application No. PCT/KR2014/002697, filed on Mar. 28, 2014, which claims the benefit and priority to Korean Patent Application No. 10-2014-0022925, filed Feb. 26, 2014. The entire disclosures of the applications identified in this paragraph are incorporated herein by references.

TECHNICAL FIELD

Embodiments of the disclosure relate to a super critical hydrolysis extraction apparatus which controls a temperature and a pressure applied to a hydrolysis extraction object effectively to improve hydrolysis extraction efficiency, and a hydrolysis method using the same.

BACKGROUND ART

It is known that the time taken to perform a hydrolysis process is reduced noticeably when the hydrolysis process is performed for a conventional object at high temperatures and high pressures.

Considering commercialization of hydrolysis objects, reducing the time taken to perform the hydrolysis for an object plays an important role in the unit cost of production. Accordingly, apparatuses for providing a high temperature and high pressure condition in various methods to a hydrolysis object are supplied.

In this connection, Korean Patent No. 1992-0017580 discloses that a pressure is applied to a pressure container via a supply line for supplying liquid for pressing an object provided in a pressure container, to cool the pressure container, using refrigerant.

However, in case of heating or cooling the pressure container itself to control the heat of the pressure container, the heat is transmitted to the object via the pressure container and the liquid. Accordingly, it takes a relatively long time to change the temperature of the object. Especially, when a mass of pressure containers and objects in consideration of productivity, the hydrolysis takes a longer time and more energy is consumed in case of applying heat to pressure containers outside.

Moreover, there may be a difference between the quantities of the heat supplied in accordance with external environment and the equipment set in accordance with an external temperature of an installation space has to be re-set disadvantageously.

In a process for raising the applied temperature to destruct enzyme after the hydrolysis process of the object, dissolved gas degasified from the object unless the temperature is raised with maintaining a critical pressure might be dispersed to the object and the hydrolyzed object might be spoiled. When using only an external heater of the pressure container in a process for raising the temperature of the pressure container, with maintaining the critical pressure to prevent the spoiled object, the time taken to raise the temperature and energy efficiency might deteriorate to deteriorate the productivity disadvantageously.

Also, when a process for removing the pressure and a process for cooling to secure the object in a state where the object a critical pressure or higher is applied to is completely hydrolyzed are performed simultaneously, the decay of the object caused by the dispersion of the dissolved gas might occur rapidly. Accordingly, the temperature has to be cooled to the lowest value so as to make the density of solvent (e.g., water) primarily, in a state of maintaining the critical pressure to minimize the decay of the object caused by the dispersion of the dissolved gas.

In case of depending on only a heating/cooling source outside the pressure container in a process for cooling the object maintaining a high temperature as well as a critical pressure, much time might be spent on the cooling of the object disadvantageously.

DISCLOSURE OF INVENTION

Technical Problem

To solve the problems, an object of the disclosure is to provide a hydrolysis extraction apparatus which can control a temperature of a hydrolysis object via circulation with maintaining a critical or higher pressure, after applying a critical pressure to a hydrolysis object, and a hydrolysis method using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the embodiments, as embodied and broadly described herein, a super critical hydrolysis extraction apparatus includes a pressure container comprising a body and a lid coupled to the body to close a space formed therein to accommodate an object; a contact unit configured to open and close the body, while moving the lid forward and backward; and a pipeline unit comprising a supply line where a liquid for filling in the pressure container and a discharge line for discharging the liquid of the pressure container.

The super critical hydrolysis extraction apparatus may further include a convey unit comprising an introducing portion for supplying the object to the body, when the body is moved forward; and a discharging portion for discharging the object provided in the body outside the body, wherein body is movable forward and backward and the lid closes the body when the body is arranged behind.

The contact unit may include a pusher die fixed to an upper end of a base; a guide bar coupled to the lid through the push die to couple and decouple the lid to the body, while moving rightward and leftward; and an inserted portion inserted between the lid and the pusher die, when the lid is coupled to the body, to prevent the lid from being pushed backward by a high pressure in the body.

In another aspect of the disclosure, a super critical hydrolysis extraction apparatus includes a pressure container in which a hydrolysis object is provided; a supply line for supplying liquid configured to fill in the pressure container; and a pressing line for additionally supplying liquid configured to apply a pressure to the hydrolysis object to the pressure container accommodating the liquid.

The super critical hydrolysis extraction apparatus may further include a storage tank in which the liquid supplied via the supply line is stored; and a temperature adjusting unit for adjusting the temperature of the liquid stored in the storage tank. The super critical hydrolysis extraction apparatus may further include a first circulation line for connecting the storage tank and the pressure container with each other.

The super critical hydrolysis extraction apparatus may further include a storage tank in which the liquid supplied via the pressing line is stored; and a temperature adjusting unit for adjusting the temperature of the liquid stored in the storage tank. The super critical hydrolysis extraction apparatus may further include a second circulation line for connecting the storage tank and the pressure container with each other.

A chamber may be provided in the pressing line to adjust the pressure of the liquid supplied from the pressing line as a preset pressure. The super critical hydrolysis extraction apparatus may further include a storage tank in which the liquid supplied via the supply line and the pressing line is stored; and a temperature adjusting unit for adjusting the temperature of the liquid stored in the storage tank.

The super critical hydrolysis extraction apparatus may further include a third circulation line for circulating the liquid of the pressure container toward the storage tank, when the liquid is supplied via the supply line; and a fourth circulation line for circulating the liquid of the pressure container toward the storage tank, when the liquid is supplied via the pressing line, wherein the storage tank and the pressure container are connected with each other.

In a further aspect of the disclosure, a hydrolysis extraction method includes a liquid filling step for filling liquid having a second temperature in a pressure container accommodating a hydrolysis object; a pressing step for increasing the pressure inside the pressure container to a second pressure by injecting the liquid into the pressure container filled with the liquid; and a temperature raising step for raising the temperature to a third temperature configured to destruct enzyme provided in the hydrolysis object, in a state of maintaining the second pressure in the first period after maintaining the pressure of the pressure container as a first pressure.

The hydrolysis extraction method may further include a temperature lowering step for lowering the temperature of the liquid to a first temperature lower than the second temperature in a state of maintaining the pressure of the pressure container as the second pressure in the second period after maintaining the pressure container at the second pressure and a third temperature, the temperature lowering step performed after the temperature raising step, the temperature lowering step performed after the temperature raising step.

The hydrolysis extraction method may further include a pressure reducing step for reducing the pressure of the pressure container to a first pressure lower than the second pressure. The hydrolysis extraction method may further include a cooling step for cooling the object, the cooling step performed after the pressure reducing step.

The hydrolysis extraction method may further include a liquid injecting step for injecting the liquid to the pressure container; and a high temperature liquid circulating step for circulating the liquid having the first temperature or higher to raise the temperature of the hydrolysis object.

The hydrolysis extraction method may further include a pressing step for increasing the pressure inside the pressure container to a second pressure by injecting liquid into the pressure container filled with the liquid; and a pressing circulating step for circulating the liquid in a state of maintaining the pressure of the pressure container as a second pressure.

Advantageous Effects of Invention

The embodiments have following advantageous effects.

Firstly, the pressing line and the high pressure line are separated, to supply the liquid to the pressure container. Accordingly, the liquid can be filled in the pressure container in a short time and also the pressure inside the pressure container can be increased to the critical pressure rapidly.

Secondly, the liquid having a specific temperature is circulated via the supply line and the first circulation line such that the temperature deep inside the hydrolysis object can be raised to the hydrolysis proper temperature in a short time.

Thirdly, the temperature and pressure inside the pressure container may be balanced effectively during the hydrolysis process of the object. Accordingly, the apparatus may be used for common use even in various external environments.

Fourthly, the temperature inside the pressure container may be raised or lowered in a state of maintaining the pressure applied to the pressure container as the critical pressure or more. Accordingly, the enzyme destruction and the object cooling may be performed in a state where the dissolved gas of the object is degasified and also the decay of the object caused by the spreading of the dissolved gas may be prevented advantageously.

The objectives and other advantages of the invention may be realized and attained by the structure particularly pointed out in the written description and claims hereof as well as the appended drawings.

BRIEF DESCRIPTION OF DRAWINGS

FIG. 1 is a plane view of a super critical hydrolysis extraction apparatus according to one embodiment of the disclosure;

FIG. 2 is a front view of a super critical hydrolysis extraction apparatus according to one embodiment of the disclosure;

FIG. 3 is a side view of a super critical hydrolysis extraction apparatus according to one embodiment of the disclosure;

FIG. 4 is a diagram schematically illustrating a pipe connection line of a pressure container provided in a super critical hydrolysis extraction apparatus according to one embodiment of the disclosure;

FIG. 5 is a diagram schematically illustrating a pipe connection line of a pressure container provided in a super critical hydrolysis extraction apparatus according to another embodiment of the disclosure;

FIG. 6 is a diagram illustrating flow of a hydrolysis method using a pressure container provided in a super critical hydrolysis extraction apparatus according to one embodiment of the disclosure;

FIG. 7 is a diagram schematically illustrating a hydrolysis process using a super critical hydrolysis extraction apparatus according to one embodiment of the disclosure; and FIG. 8 is a diagram schematically illustrating a hydrolysis process using a super critical hydrolysis extraction apparatus according to another embodiment of the disclosure.

MODE FOR THE INVENTION

Hereinafter, exemplary embodiments of the disclosure will be described in detail, referring to the accompanying drawings. For the sake of brief description with reference to the drawings, the same or equivalent components will be provided with the same reference numbers, and description thereof will not be repeated.

A super critical hydrolysis extraction apparatus according to embodiments of the disclosure is an apparatus for hydrolyze or extract an object by controlling a temperature and a pressure applied to an object according to supplying of liquid with a controllable temperature, after an object is provided in a pressure container.

In other words, the object is placed in the pressure container and then a process for high pressure dissolution extraction for the object may be performed through a process which will be described hereinafter.

FIG. 1 is a plane view of a super critical hydrolysis extraction apparatus according to one embodiment of the disclosure. FIG. 2 is a front view of a super critical hydrolysis extraction apparatus according to one embodiment of the disclosure. FIG. 3 is a side view of a super critical hydrolysis extraction apparatus according to one embodiment of the disclosure.

Referring to FIGS. 1, 2 and 3, the super critical hydrolysis extraction apparatus is configured to close a pressure container 210 airtight stably, while moving a vessel 240 receiving an object inward and outward with respect to a pressure container 210. The super critical hydrolysis extraction apparatus includes a pressure container 210, a contact unit 220 and a convey unit 230.

The pressure 210 includes a body 211 and a lid 212.

In the body 211 may be formed a predetermined space to receive a vessel 240 where the object is provided and a hole is formed in the body to move the vessel 240 there through. Specifically, the body 211 disclosed in this embodiment is cylinder-shaped, with a hole 211a formed in each of front and rear surfaces.

The body 211 may be movable in a forward and backward direction. When the body 211 is conveyed forward, the vessel 240 is moved inward or outward. When conveyed backward, the body 211 is closed 211 as the lid 212 is closed.

Meanwhile, the body 211 may be movable forward and backward in various methods. In this embodiment, the body 211 may be fixed on a movable plate 213 by a pair of clamps 216 such that the movable plate 213 can move along a guide 215.

The lid 212 is configured to close the hole of the body 211. Specifically, a pair of lids 212 may be insertedly fitted to the holes 211a formed in the front and rear surfaces of the body 211, respectively.

Although not shown in the drawings, the body 211 or the lid 212 may be connected to a supply line 20, a pressure line 30, a first circulation line 60, a second circulation line 70 and a filling line 90, so as to inject or exhaust the liquid to an internal space of the body 211.

However, considering that a high pressure is applied to the internal space of the pressure container 200, it is preferred that a plurality of lines may be connected to the lid 212 which can stand the pressure relatively more than the body 211. The configuration connected to the pipeline and the pressure application process enabled by the controlled injection of the liquid will be described later.

In addition, a band heater is provided in the pressure container 200 to adjust the temperature of the pressure container and the temperature control of the injected liquid enabled hereinafter will be descried later in detail.

The contact unit 220 is configured to open and close the body 211, with moving the lid 212 forward and backward. Specifically, a pair of contact units 220 may be provided in this embodiment. The pair of the contact units 220 has the same configuration and operation, except different installation positions. Accordingly, one of the pairs will be described in detail.

Specifically, the contact unit 220 includes a pusher die 221 fixed to a top of the base and a guide bar 222 movable rightward and leftward through the pusher die 221, with one end connected to the lid 212. The motion of the guide bar 222 enables the lid 212 to open and close the body 211.

Meanwhile, the contact unit 220 according to the embodiments of the disclosure may further include an inserted portion 223 inserted between the lid 212 and the pusher die 221 as a key to prevent the lid 212 from being pushed backward when a high pressure is applied to the pressure container 200.

The inserted portion 223 is formed as thick as inserted between a back side of the lid and a front side of the pusher die, when the lid is inserted. The inserted portion may be movable forward and backward by various driving methods.

The convey unit 230 includes an introducing portion 231 for introducing the vessel 240 to the body 211 and an discharging portion 232 for discharging the hydrolyzed vessel 240 outside the body 211.

The introducing portion 231 further include a pusher 231 arranged on the right of the body 211 moved forward, to push the vessel 231 into the body 211.

The discharging portion 232 is arranged on the left of the body 211 moved forward. A plurality of rollers 232a may be arranged in the discharging portion 232 to discharge the vessel 240 outside the body 211 there along.

Hereinafter, the operation of the hydrolysis extraction apparatus according to the embodiments of the disclosure described above will be described.

The vessel 240 receiving the object is introduced to the introducing portion and the pusher 231a pushes the vessel 240 to the internal space of the body 211, such that the body 211 can move backward.

When the body 211 moves backward, the guide bar 222 moves to move the lid 212 toward the body 211, such that the body 211 can be closed airtight. Then, the inserted portion 223 is inserted between the lid 212 and the pusher die 221 to secure the lid.

The hydrolysis extraction may further include a frame 250 for fixing the pair of the pusher dies 221, with a lower portion fixed to the base.

The frame 250 is functioned to support the pair of the pusher dies 221 receiving the power generated by the internal pressure of the pressure container stably, when a high pressure is applied to the pressure container 200. Specifically, the lower portion of the frame 250 may be formed in a "⌒" shape such that both ends can be coupled to the pair of the pusher dies 221.

As the liquid having the adjusted temperature is injected into or discharged from the pressure container 200, a required temperature and a required pressure are applied to the object. In this process, the hydrolysis of the object is performed which will be described later in detail.

Once the object is hydrolyzed, the inserted portion 223 moves backward and the lid 212 is open.

The body 211 having the vessel 240 arranged therein may move forward. As the pusher 231a of the introducing portion 231 pushes a new vessel 240, the hydrolyzed vessel 240 is pushed by the new vessel not hydrolyzed yet only to be discharged from the body 211. After that, the hydrolyzed vessel 240 is conveyed to equipment for a following process along the discharging portion 232 by the roller 232a.

In other words, a series of processes for introducing, closing, hydrolyzing and discharging the vessel 240 in which the hydrolysis object is provided may be automatically performed in accordance with the configuration mentioned above. The productivity of the process for manufacturing the hydrolyzed object for common use can be increased.

Hereinafter will be described the configuration of the pipeline for injecting, circulating and discharging the liquid having the temperature adjusted to hydrolyze the object and the process for applying the temperature and pressure to the object.

FIG. 4 is a schematic diagram of a super critical hydrolysis extraction apparatus according to one embodiment of the disclosure.

Referring to FIG. 4, the hydrolysis extraction apparatus according to the present disclosure includes a pressure container, an air supply line 20 and a pressure line 30. In a state where a flexible container having a hydrolysis object, water and enzyme is provided in a pressure container, liquid having an adjustable temperature is injected into the pressure container at a high pressure. As a pressure and a temperature inside the pressure container are controlled, the object is hydrolyzed.

The pressure container 200 provides a predetermined space (S) to accommodate the object. In a state where the object is arranged in the space (S), liquid is filled in the space and a pressure is applied to the object based on the quantity of the filled liquid.

As mentioned above, the pressure container 200 is closable and a user places the object in the pressure container 200. After the hydrolysis process, the user takes out the pressure container 200 out of the pressure container 200. Also, various measuring instruments capable of measuring and monitoring the pressure/temperature of the liquid filled in the pressure container may be provided in the pressure container.

Various typed heating units for heating the pressure container may be provided in the pressure container 200, to raise or maintain the temperature of the liquid filled in the pressure container. Specifically, in this embodiment, a heater 200a may be provided partially around the pressure container 200 to heat the pressure container 200 such that heat can be transmitted into the pressure container 200.

In other words, the temperature of the flowing liquid may be adjusted by a temperature adjusting unit 50 and the temperature applied to the liquid filled in the pressure container may be adjusted by the heater 200a simultaneously. Accordingly, the temperature transmitted to the hydrolysis object can be controlled in a relatively short time.

Accordingly, the temperature of the liquid adjusted by the temperature adjusting unit 50, which could gradually falls with the time, may be compensated to maintain the temperature inside the pressure container 200.

Meanwhile, as the temperature of the liquid adjusted by the heater 200a rises, the pressure inside the pressure container can rise. In this instance, the liquid filled in the pressure container may be discharged through the pipelines connected to the pressure container which will be described later and an auxiliary pipeline, to enable pressure balancing to keep a desired pressure.

The discharging of the liquid for the pressure balancing may be enabled based on the capacity of the pressure container by a first circulation line 60, a second circulation line 70 and a pressure adjusting line 60a which will be described later.

Meanwhile, an airtight container (P, see FIG. 6) formed of a flexible material accommodates the object together with water and enzyme. The flexible container accommodating the object, water and enzyme may be arranged in the pressure container 200, such that the object can be hydrolyzed through the activation of the enzyme in a pressure/temperature condition generated by the liquid having the specific temperature.

Specifically, for instance, ground meat is placed in vinyl and a proper enzyme for dissolving is added. After that, the vinyl is closed airtight and the meat is hydrolyzed via the pressure applied by the liquid having the specific temperature, such that the meat can be changed into liquid. Specific hydrolysis processes will be described later.

The supply line 20 is configured to supply the liquid which will be filled in the pressure container 200. Specifically, the supply line 20 connects the pressure container 200 with a storage tank 40 which will be described later, such that the specific temperature liquid stored in the storage tank 40 is supplied to the pressure container 200 to fill in the internal space (S) of the pressure container 200.

The pressure line 30 additionally supplies liquid to apply a pressure to the hydrolysis object to the pressure container 200 filled with the liquid. The pressure line 30 also connects the pressure container 200 with the storage tank 40 such that the specific temperature liquid stored in the storage tank 40 may be supplied to the pressure container 200.

In other words, the internal space (S) of the pressure container 200 is filled with the liquid supplied via the supply line 20 and the liquid is additionally supplied to the space filled with the liquid via the pressure line 30, such that the pressure inside the pressure container 200 can be increased gradually.

Meanwhile, each of the supply line 20 and the pressure line 30 may include a pump (P) and the types and capacities of the pumps (P) may be differently determined based on the different purposes of the supply line 20 and the pressure line 30 which are whether to fill the liquid with the space (S) of the pressure container 200 or to increase the pressure of the liquid filled in the space (S).

Also, the kinds of the pipes composing the supply line 20 and the pressure line 30 may be differently determined based on design conditions for achieving the different purposes. The types of valves for opening and closing the pipes may be various.

The high pressure hydrolysis extraction apparatus may further include the storage tank 40 and the temperature adjusting unit 50.

The storage tank 40 stores the liquid therein before supplied via to the pressure container 200. Storage tanks may be provided in the supply line 20 and the pressure line 30, respectively. In this embodiment, the liquid is supplied from one storage tank 40.

The temperature adjusting unit 50 is configured to adjust the temperature of the liquid stored in the storage tank 40. In the present embodiment, the temperature adjusting unit 50 may be provided as an independent component from the storage tank 40 to adjust the temperature of the liquid supplied to the storage tank 40. However, the embodiment of the present disclosure is not limited thereto.

Alternatively, the liquid heated to a specific temperature desired by the user may be supplied to the supply line 20 and the pressure line 30 from the storage tank 40 including the temperature adjusting unit 50. Accordingly, there is an advantage that the temperature of the liquid filled in the pressure container 200 can be adjusted in a relatively shorter time than the method of adjusting the temperature, using the heater 200a provided in the pressure container 200 to heat a normal temperature liquid filled in the pressure container 200.

Especially, there is an advantage of reducing the time taken to raise the temperature of the liquid filled in the pressure container 200 (50° C.~75° C.) or to drop the temperature of the liquid (75° C.~4° C.) in a state where the pressure inside the pressure container is kept at 1000 bar.

The hydrolysis extraction apparatus may further include the first circulation line 60 and the second circulation line 70 for connecting the storage tank 40 with the pressure container 200.

The first circulation line 60 is configured to circulate the liquid filled in the pressure container 200 toward the storage tank 40, when the liquid is supplied via the supply line 20.

The second circulation line 70 is configured to circulate the liquid filled in the pressure container 200 toward the storage tank 40, in a state of maintaining a target pressure when the liquid is supplied via the pressure line 30. When the liquid is circulated via the circulation line 30, a target pressure and a target temperature may be maintained in the pressure container 200.

Meanwhile, when the storage tanks for supplying the liquid via the supply line 20 and the pressure line 30 is provided for the supply line 20 and the pressure line 30, respectively, the first circulation line 60 and the second circulation line 70 may be connected to the storage tanks, respectively. As the single storage tank 40 is provided in this embodiment, one ends of the first circulation line 60 and the second circulation line 70 may be connected to the pressure container 200 and the other ends are connected to the storage tank 40.

The supply line 20, the pressure line 30, the first circulation line 60 and the second circulation line 70 may have a diameter determined to pass a preset quantity of liquid based on design conditions there through. Although not shown in the drawings, there may be provided a check valve, a solenoid valve and the like for controlling the liquid flowing along the lines effectively based on design conditions. The configurations may be easily installed by those skilled in the art based on the design conditions and the detailed descriptions of the configurations are omitted accordingly.

The size of the pressure container 200 may be differentiated variously. In case of a small sized pressure container 200 having a small capacity object, the other space filled with the liquid is relatively small in a state where the object is provided in the pressure container 200. For instance, when the overall capacity of the pressure container 200 is 50 L and the capacity of the object is 40 L, the capacity of the liquid which has to be supplied for the filling is 10 L. Although the 10 L liquid is supplied to the pressure container 200 via the supply line 20, the supply time may be shorter.

However, in case of a large size pressure container 200, for instance, the capacity of the pressure container is 300 L and the capacity of the object is 200 L such that the capacity of the liquid which has to be supplied for the filling may be 100 L.

As mentioned above, the supply line 20 has the diameter large enough to circulate the liquid, passing the first circulation line 60 and the storage tank 50. Accordingly, the size of the diameter cannot but be limited. It is more advantageous in an aspect of an overall process time to supply the 100 L liquid via an auxiliary line than via the supply line 20.

The hydrolysis extraction apparatus may further include a filling line 90. The filling line 90 is configured to fill a primary liquid in the pressure container 200. When the large capacity pressure container 200 is provided, the filling line 20 has a larger diameter than the supply line 20 to fill the liquid in the pressure container 200 effectively.

The liquid supplied via the filling line 90 is connected to the storage tank 40 as shown in FIG. 1 and water having an adjusted temperature (e.g., 50° C.) is supplied from the storage tank 40.

As shown in FIG. 2, an auxiliary storage tank 40' may be provided and the liquid may be supplied via a filling line 90' provided in the auxiliary storage tank 40'. The liquid set to have a desired temperature is stored in the storage tank 40' and the liquid is filled in the pressure container 200 directly from the storage tank 40'.

Meanwhile, the quantity of the liquid supplied via the supply line 20 and the pressure line 30 is relatively smaller than the quantity of the liquid supplied via the filling line 90'. Accordingly, the storage tank 40 and 40' optimized in accordance with the capacity may be provided and the temperature of the liquid supplied from each of the storage tanks 40 and 40' can be adjusted more effectively.

The temperature adjusting unit 80 may be provided in the pressure line 30 to adjust the temperature of the liquid flowing along the pressure line 30. Accordingly, the temperature of the liquid supplied via the pressure line 30 can be adjusted effectively.

For instance, when the liquid having a temperature of 50° C. is pressed at a pressure of 1000 bar, the capacity of the pump has to be increased to 30% or more in comparison with the capacity when the normal temperature liquid is pressured.

Not pressing the high temperature liquid, the temperature of the liquid is raised by the heat applied to the liquid flowing along the pressure line 30 in a state of pressing the liquid at 1000 bar. Accordingly, there is an advantage that the liquid having the required temperature can be supplied, although the pump (P) having a relatively small capacity is provided in the pressure line 3.

Accordingly, the normal temperature liquid is supplied from the storage tank 40 or the auxiliary storage and pressed by the pump. After that, the pressured liquid is heated by the temperature adjusting unit 80 to be supplied to the pressure container 200.

However, liquid having a lower temperature than a target temperature adjusted by the temperature adjusting unit 50 of the storage tank 40 based on conditions required by the pressure container 200 may be supplied and pressed by the pump. After that, the liquid is additionally heated by the temperature adjusting unit 80 of the pressure line 30 and supplied to the pressure container 200.

When using the high pressure hydrolysis extraction apparatus according to the embodiments of the disclosure, the liquid having the adjusted temperature can be supplied via the supply line 20 and the pressure line 30 in a moment. As the pressure/temperature may be adjusted immediately, effective hydrolysis for the object may be possible.

The liquid having the adjusted temperature can be circulated through the first circulation line 60, the second circulation line 70 and the storage tank 40 and the temperature applied to the object can be maintained, not dropped by external environments such as heat emission through the pressure container.

Especially, when performing a temperature raising step (S30) and a temperature lowering step (S40), there is an advantage that the temperature can be adjusted by circulating the liquid through the pressure line 30 and the second circulation line 70, in a state where the pressure of the pressure container is maintained at a critical pressure or more.

In addition, the filling line 90 and 90' and the auxiliary storage tank 40' are provided in accordance with the capacity of the pressure container 200, such that the quantity of the heat supplied from the entire system can be utilized effectively.

The hydrolysis apparatus according to the embodiments of the disclosure may further include a pressure adjusting line 60*a* connected to the pressure container 200 to adjust a pressure inside the pressure container 200 as the liquid is discharged.

The hydrolysis extraction apparatus include the first circulation line 60 and the second circulation line 70 for discharging the liquid from the pressure container 200. The discharging of the liquid can adjust the pressure inside the pressure container 200. However, the minute pressure inside the pressure container 200 may be adjusted by a pressure adjusting line 60*a* having a relatively smaller diameter than the first circulation line 60 and the second circulation line 70, to adjust the minute pressure based on the capacity of the pressure container 200.

Specifically, the state of the pressure container has to be kept at a temperature of 50° C. and a pressure of 1000 bar for a preset time period (e.g., 24 hours) while the object is hydrolyzed. In the process of maintaining the temperature (adjusting the temperature, using the heater and the temperature of the liquid), the pressure inside the pressure container changes minutely and the change has to be compensated. Also, the pressure inside the pressure container changes minutely based on changes in volumes of the airtight closed container and the change has to be compensated.

That is, the pressure is minutely hunted in the process of maintaining a specific pressure out of the entire processes. It is important to reduce the hunting of the pressure so as to improve hydrolysis efficiency and the discharging of the liquid is accurately adjusted via the pressure adjusting line 60*a*, only to minimize the hunting of the pressure.

Meanwhile, it is possible to discharge the liquid via the first circulation line 60 or the second circulation line 70 mentioned above to as to control the pressure hunting. In case of using the large capacity of the pressure container 200, the pressure of the pressure container 200 may be controlled more accurately through the pressure adjusting line 60*a* having a smaller diameter than the first circulation line 60 and the second circulation line 70.

The other end of the pressure adjusting line 60*a* is connected to the first circulation line 60 and the liquid discharged along the pressure adjusting line 60*a* is drawn into the storage tank 40 along the first circulation line 60, or connected to the second circulation line 70 or discharged outside. Also, a valve (e.g., a solenoid valve) may be provided in the pressure adjusting line 60*a* to open and close the pressure adjusting line 60.

Hereinafter, a method for hydrolyzing the object, using the hydrolysis extraction apparatus, will be described.

The method according to the embodiment of the disclosure adjusts the temperature of the circulating liquid and can effectively hydrolyze the object more rapidly than the method hydrolyzing the object, using only the heater 200*a*.

The effective adjustment of the temperature may be possible by steps of 1) raising the temperature of the object to a preset hydrolysis proper temperature, 2) balancing the temperature and the pressure in the process of maintaining the pressure and temperature of the liquid at a critical pressure or more and a hydrolysis proper value, 3) raising the temperature in a state of maintaining the critical pressure or more, 4) circulating the liquid having the temperature adjusted in four temperature lowering steps in the state of maintaining the critical pressure or more.

Specifically, the hydrolysis method using the hydrolysis extraction apparatus includes a liquid filling step (S10), a pressing step (S20), a temperature raising step (S30), a temperature dropping step (S40) and a pressure reducing step (S50).

Meanwhile, the object for the hydrolysis may be various decomposition materials (e.g., protein materials and carbohydrate materials). In the present disclosure, the object is animal protein (e.g., protein from meat). The object (e.g., beef) is ground and the flexible container accommodates the ground beef together with water and enzyme (①).

A vessel 11 having a plurality of holes formed therein accommodates the flexible container having the object, water and enzyme (②) and the vessel 11 accommodating the flexible container is conveyed into the body 211 of the pressure container (②). The body 211 accommodating the vessel 11 moves toward the hydrolysis extraction apparatus according to the embodiments of the disclosure. When the lid 212 of the pressure container 200 is coupled to the body 211, the pressure container 200 is closed airtight with the vessel provided therein.

The liquid filling step (S10) fills the liquid having a second temperature in the pressure container 1 accommodating the object.

In this embodiment, the injected liquid is not limited to water and also the enzyme can be varied according to the object.

The hydrolysis proper temperature as a reference for the second temperature may be determined based on 1) a temperature having the highest enzyme usage to promote activation of dissolution caused by the enzyme, 2) a temperature which generates no displacement of an index material (e.g., carbohydrate, protein, fat, vitamin and index materials) contained in the object (e.g., beef), 3) a temperature which increases the quantity of molecule motion of water as a carrier of enzyme. In this embodiment, the hydrolysis proper temperature may be 50° C.

A temperature as a reference of a third temperature at which the enzyme starts to be destructed may be 75° C.

After the object is provided in the pressure container, the pressure container is closed airtight and water is injected to the pressure container via the supply line 20.

At this time, the water injected into the pressure container is primarily supplied to the storage tank 40, with a temperature raised to a second temperature preset by the temperature adjusting unit 50 and supplied to the pressure container via the supply line 20.

The second temperature may be determined to be the hydrolysis proper temperature of the object (e.g., 50° C.) or higher to make the heat loss or the object reach the hydrolysis proper temperature.

Generally, when heating the pressure container 1 accommodating the normal temperature water injected therein to the hydrolysis proper temperature, using the heater 200*a*, the heat generated from the heater 200*a* heats the water filled in the pressure container 1 and the object is heated as the temperature of the water rises.

In contrast, in the present disclosure, as the liquid having a temperature raised to the second temperature is supplied, the heat can be supplied to the object more effectively than the heat supplied only by the heater 200*a*.

To transmit the heat of the object effectively, the liquid filling step (S10) includes a liquid injecting step (S11) and a high temperature liquid circulating step (S12).

The liquid injecting step (S11) injects the liquid into the pressure container 200. In this instance, the liquid supplied to the pressure container 200 may have a normal temperature or an adjusted temperature. It is preferred that the temperature of the liquid supplied to the pressure container 200 may be adjusted to the hydrolysis proper temperature (50° C.) mentioned above or higher.

In case of using the small capacity pressure container 200 mentioned above, the liquid having the temperature adjusted in the storage tank 40 may be supplied via the supply line 20. Alternatively, the liquid having the temperature adjusted in the storage tank 40 may be supplied via the filling line 90.

In case of using the large capacity pressure container 200, a large quantity of the liquid having the temperature adjusted in the storage tank (40', see FIG. 5) storing the liquid therein may be prepared and the large quantity of the liquid may be supplied via the auxiliary filling line 90'.

In other words, a series of processes for a plurality of airtight closed containers may be designed in various ways according to the capacity of the pressure container.

The high temperature liquid circulating step (S11) circulates the liquid having a second temperature, until the temperature of the object filled in the pressure container 200 reaches the hydrolysis proper temperature. Specifically, in this embodiment, the temperature adjusting unit 50 adjusts the temperature of the liquid stored in the storage tank 40 to 50° C. The water circulates through the supply line 20, the pressure container 200, the first circulation line 60 and the storage tank 40.

For instance, when the capacity of the pressure container 200 is 300 L and the capacity of the object is 200 L, the capacity of the filled liquid is 100 L. Additional heat has to be provided so as to raise the temperature of the 200 L object to 50° C.

In other words, if the additional quantity of the heat is not supplied to the pressure container 200 filled with the 100 L liquid, the liquid having the temperature of 50° C. or higher in the storage tank 50 may be supplied to the pressure container 200 via the supply line 20.

In this instance, the pressure inside the pressure container can be increased as the heat is supplied by the heater 200a. The liquid is discharged via a pipeline connected to the pressure container or an auxiliary pipeline to enable the balancing of the pressure.

The liquid having passed the first circulation line 60 once the temperature falls may be drawn into the storage tank 40. The temperature adjusting unit 50 may supply proper heat to maintain a desired temperature of the liquid.

The liquid having passed the first circulation line 60, with the lowered temperature, may be drawn into the storage tank 40. The temperature adjusting unit 50 may supply a proper heat to maintain 50° C. of the liquid stored in the storage tank 40.

Accordingly, the heat with a preset temperature is applied to the object continuously, to make the object reach the hydrolysis proper temperature. In the present embodiment, the second temperature is raised or lowered and adjusted according to the pressure and temperature of the pressure container in the supplying step.

Moreover, when adjusting the temperature additionally, using the heater 200a, more accurate temperature control may be enabled.

When the liquid is supplied via the auxiliary filling line 90' and the storage tank 40, the quantity of the circulated liquid is relatively smaller than the quantity of the supplied liquid. Accordingly, in the filling step, the liquid of the storage tank 40' is supplied. In the circulating step, the liquid is circulated via the supply line 20 and the storage tank 40 connected to the first circulation line 60.

The high temperature liquid circulating step (S12) closes a valve (V) installed in each of the circulation line 20 and the first circulation line 60, when determining that the temperature inside the object reaches 50° C., such that the water having the temperature of 50° C. can be filled in the pressure container 200.

The pressing step (S20) pressures and injects the liquid into the pressure container, to raise the pressure inside the pressure container to a second pressure. The second pressure is variable based on types of the object and enzyme and the hydrolysis conditions. In the present embodiment, the second pressure is 1000 bar.

Here, the second pressure may be determined based on conditions set 1) to improve the quantity of molecule motion of the water as a carrier of enzyme, (2) to degasify the dissolved gas to prevent the decay of the object during the hydrolysis process, 3) to maintain the pressure determined to maintain the shape of the enzyme and not to destruct the enzyme.

In other words, the second pressure may be determined as a critical pressure or more of a solvent based on the conditions and the second temperature.

Specifically, the temperature of 50° C. and the pressure of 1000 bar are applied to the object in the liquid filling step and the pressing step. Under the conditions set not to destruct the enzyme, a high pressure which is a critical pressure or higher is applied and the dissolved gas of the object is degasified. The molecule motion of the water as the enzyme carrier is promoted the enzyme hydrolyzes the object rapidly.

The pressure and temperature has to be maintained for a specific time period to hydrolyze the object. Specifically, the temperature of the liquid may be influenced according to the heat emission or absorption in an object hydrolyzing step. The pressure is changed minutely according to the changing temperature of the liquid.

Accordingly, the embodiment may control the temperature, using the heater 200a. The pressure inside the pressure container 200 may be balanced for a required time period, using the liquid injection and discharging via the pressure line 30 and the second circulation line 70. The pressure may be balanced by the discharging of the liquid via a pressure adjusting line 60a.

When injecting the liquid via the pressure line 30, the liquid having a preset temperature based on the temperature of the liquid adjusted by the storage tank 40 or the temperature adjusting unit 80 is injected, only to balance the temperature and pressure.

The pressure and temperature may be balanced, using the heater 200a and the temperature adjustment of the circulated liquid. Although external environments are changed, the hydrolysis of the object can be quantized.

More specifically, the pressing step (S20) according to the embodiment of the disclosure further includes a pressing step (S21) and a pressing circulation step (S22).

The pressing step (S21) applies a pressure to the object by injecting the liquid to the object.

The pressing circulation step (S22) circulates the liquid in a state where the temperature of 50° C. and the pressure of 1000 bar are applied to the pressure container 200. In this instance, the water having the temperature of 50° C. provides the temperature of 50° C. and the pressure of 1000 bar to the object continuously, while circulated along the pressing line 30, the pressure container 200, the second circulation line 70 and the storage tank 40.

When the water is not circulated, the temperature inside the pressure container may be gradually and continuously lowered by the heat loss caused in the hydrolysis step and the heat emission outside the pressure container. Accordingly, the water having the temperature of 50° C. may be circulated through the pressing line 30 and the second circulation line 70, in a state where the pressure inside the container is maintained, such that more effective hydrolysis can be induced.

Moreover, the water having the temperature of 50° C. or higher is pressed in the storage tank 40 and supplied to the pressure container. The water having a temperature of 50° C. or lower is heated by the temperature adjusting unit 80 and supplied to the pressure container. The water supplied from a liquid supply source (not shown) is heated by the temperature adjusting unit 80 and supplied to the pressure container.

The temperature raising step (S30) raises the temperature of the water provided in the pressure container to a third temperature for destruct the enzyme inside the container. The third temperature may be variable based on the kind of the enzyme and other conditions. The object is dissolved by the enzyme after hydrolyzed.

Especially, the temperature is raised in a state where the second pressure (the critical pressure, 1000 bar) applied to the object in the hydrolyzing step is maintained.

Accordingly, the dissolved oxygen (DO) inside the flexible container accommodating the object may be not be spread in the flexible container and fat from the hydrolyzed results reacts with the dissolved oxygen to prevent the decay of the object.

The rise of the temperature may be realized by the hat supplied by the heart 200$a$. or, it may be realized by the circulation of the liquid having the third temperature keeping the critical pressure or more via the pressing line 30 and the second circulation line 70 after the temperature of the liquid stored in the storage tank 40 is raised to a third temperature or higher by the temperature adjusting unit 50. In addition, the two cases may be performed simultaneously for more effective temperature rise in a more rapid time.

In case of using the heater 200$a$, the temperature of the liquid is raised by the heater 200$a$ and the pressure of the liquid inside the pressure container 200 may be increased. For balancing that, the liquid may be partially discharged outside via the pipeline mentioned above or the auxiliary pipeline.

When using the pressure container having a large capacity, it takes much time to raise the temperature inside of the pressure container to the second temperature, using the heater 200$a$. Accordingly, the high temperature/pressure liquid may be supplied via the pressing line 30 continuously and discharged via the second circulation line 70 at the same time, such that the temperature inside the pressure container 200 can be raised.

When the temperature is raised in the state of maintaining the pressure as mentioned above, the pressure is improved and adjusted via at least one of the first circulation line 60, the second circulation line 70 and the pressure adjusting line 60$a$, while monitoring the increase of the pressure.

The temperature lowering step (S40) lowers the pressure of the pressure container to a first pressure and the temperature of the pressure container 200 to a second temperature lower than the first temperature after the second temperature is kept for the second period. Specifically, the present embodiment lowers the temperature of the liquid to the first temperature, in a state of maintaining the pressure as 1000 bar. Here, the first temperature is determined as a temperature at which the density of the liquefied object accommodated in the container is the highest (4° C. at which the density of water is the highest).

Moreover, the temperature is lowered with the pressure kept as 1000 bar while the liquid having a lowered temperature may be circulated via the pressing line 30 and the second circulation line 70, similar to the temperature raising step.

When the cooling of the object and the pressure removing are performed to secure the object under the third temperature and second pressure conditions of the temperature raising step, the dissolved gas inside the flexible container may be spread in the flexible container and reacted with fat from the hydrolysis object and the fat is oxidized.

Accordingly, the cooling of the object is performed in a state of keeping the second pressure (the critical pressure) and fat oxidization of the object hydrolyzed in the airtight closed space is suppressed maximally.

Specifically, the high temperature liquid is discharged via the second circulation line 70, in a state of keeping the pressure. At the same time, the low temperature liquid is continuously supplied via the pressing line 30 in a state of keeping the pressure.

The supplied liquid may have a third temperature (4° C. in this embodiment) or lower based on the capacity of the pressure container 200 and the volume of the object.

Once the temperature lowering step (S40) lowers the temperature of the water inside the object to the lowest temperature of 4° C., the pressure reducing step (50) reduced the pressure to a first pressure (e.g., an atmospheric pressure) lower than the second pressure and places the object out of the pressure container 200 to secure a final hydrolyzed object.

Therefore, the pressure removing and the cooling are performed separately. In a state where the pressure is maintained to suppress the activation of the dissolved gas, the cooling is performed to keep the highest density of the liquid (water). As the cooling is performed in a state where the density of the liquid (water) is the highest, the decay of the object caused by the dissolved gas may be minimized advantageously.

Specifically, once the hydrolysis is completed, the lid 212 of the pressure container 200 is open and the body 211 of the pressure container 200 is moved outward from the hydrolysis extraction apparatus (④). Hence, the vessel 11 is moved outward from the body 211 (⑤) and the flexible container (P) is taken out from the vessel 11, only to get the final hydrolyzed object.

In the embodiments of the disclosure, the temperature lowering step (S40) may be omitted and the object can be cooled after the pressure reducing step (S50). As shown in FIG. 5, the enzyme is destructed at 75° C. and the pressure of the pressure container 200 is removed. In this instance, the flexible container (P) maintains a high temperature state and the high temperature vessel is injected to a cooler 100 to cool the vessel.

Types and cooling methods of the cooler may be various. Considering convenience on the line supplied in a horizontal direction, the cooler 100 may be provided horizontally and stands vertically after the vessel 11 is introduced, such that it can cool the object while rotating.

Meanwhile, the hydrolyzed object is provided in a liquid state. The cooling in that state can be performed more stably and effectively than a case where the capacity of the object is large (e.g., 200 L) and a cooler standing vertically is rotated to cool the liquidized object.

In the embodiment, as the cooling is performed outside the hydrolysis extraction apparatus, the pressure container 200 need not be cooled. Accordingly, when hydrolyzing a plurality of objects serially, the pressure container 200 can maintain a predeterminedly heated state. When a new object is drawn into the apparatus, the temperature of the object is the hydrolysis proper temperature (e.g., 50° C.) such that the required time can be reduced.

In the hydrolysis method of the present disclosure, the hydrolysis completion and the enzyme destruction are performed. After that, the pressure and temperature inside the pressure container is not reduced to at atmospheric pressure and a normal temperature in a process of gaining an object. As the temperature lowering and the pressure lowering are performed separately, the dissolved gas contained in the airtight container accommodating the object may be spread in the airtight closed container according to the strengthened pressure, only to prevent the dissolution with fat.

Various variations and modifications of the refrigerator described above are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An apparatus comprising:
a pressure container comprising a body and a lid coupled to the body to close a space formed therein to accommodate an object;
a contact unit configured to open and close the body; and
pipeline unit comprising a supply line for supplying a liquid for filling in the pressure container and a discharge line for discharging the liquid of the pressure container;
wherein the contact unit comprises
a pusher die fixed to an upper end of a base;
a guide bar coupled to the lid through the pusher die to couple and decouple the lid to the body; and
an inserted portion inserted between the lid and the pusher die, when the lid is coupled to the body, to prevent the lid from being pushed backward by a high pressure in the body.

2. The apparatus of claim 1, further comprising:
a convey unit comprising an introducing portion for supplying the object to the body; and a discharging portion for discharging the object provided in the body outside the body,
wherein
the lid closes the body when the body is arranged in a rear side.

3. The apparatus of claim 1, further comprising:
a frame for fixing the pusher die and an additional pusher die to an upper end of the base, wherein lateral surfaces of the body are open, and
the contact units are provided on two sides of the pressure container.

4. An apparatus comprising:
a pressure container to accommodate a hydrolysis object;
a contact unit
a supply line for supplying the liquid configured to fill in a pressure container; and
a pressing line for additionally supplying to the pressure container accommodating the object, a liquid to apply a pressure to the hydrolysis object,
wherein the contact unit comprises:
a pusher die fixed to an upper end of a base;
a guide bar coupled to a lid through the pusher die to couple and decouple the lid to the body; and
an inserted portion inserted between the lid and the pusher die, when the lid is coupled to the body, to prevent the lid from being pushed backward by a high pressure in the body.

5. The apparatus of claim 4, further comprising:
a storage tank in which the liquid supplied via the supply line is stored; and
a temperature adjusting unit for adjusting a temperature of the liquid stored in the storage tank.

6. The apparatus of claim 5, further comprising:
a first circulation line for connecting the storage tank and the pressure container with each other.

7. The apparatus of claim 4, further comprising:
a storage tank in which the liquid supplied via the pressing line is stored; and
a temperature adjusting unit for adjusting a temperature of the liquid stored in the storage tank.

8. The apparatus of claim 7, further comprising:
a second circulation line for connecting the storage tank and the pressure container with each other.

9. The apparatus of claim 8, wherein a temperature adjusting unit for adjusting a temperature of the liquid supplied via the pressing line is provided in the pressing line.

10. The apparatus of claim 4, further comprising:
a storage tank in which the liquid supplied via the supply line and the pressing line is stored; and
a temperature adjusting unit for adjusting a temperature of the liquid stored in the storage tank.

11. The apparatus of claim 10, further comprising:
a third circulation line for circulating the liquid of the pressure container toward the storage tank, when the liquid is supplied via the supply line; and
a fourth circulation line for circulating the liquid of the pressure container toward the storage tank, when the liquid is supplied via the pressing line,
wherein the storage tank and the pressure container are connected with each other.

12. The apparatus of claim 4, further comprising:
a pressure adjusting line connected with the pressure container to adjust a pressure inside the pressure container while the liquid filled in the pressure container is discharged.

* * * * *